US012084325B2

(12) United States Patent
Watson

(10) Patent No.: US 12,084,325 B2
(45) Date of Patent: Sep. 10, 2024

(54) MANHOLE COVER LIFTER

(71) Applicant: Arthur R. Watson, Jacksonville, FL (US)

(72) Inventor: Arthur R. Watson, Jacksonville, FL (US)

( * ) Notice: Subject to any disclaimer, the term of this patent is extended or adjusted under 35 U.S.C. 154(b) by 12 days.

(21) Appl. No.: 18/167,481

(22) Filed: Feb. 10, 2023

(65) Prior Publication Data

US 2024/0270555 A1 Aug. 15, 2024

(51) Int. Cl.
*B66F 19/00* (2006.01)

(52) U.S. Cl.
CPC .................................. *B66F 19/005* (2013.01)

(58) Field of Classification Search
CPC ........ B66F 15/00; B66F 19/00; B66F 19/005; B25G 3/20–24
See application file for complete search history.

(56) References Cited

U.S. PATENT DOCUMENTS 3,861,649 A * 1/1975 Mosley .................... B25B 27/02 254/124
4,488,706 A * 12/1984 Kono .................... B66F 19/005 280/47.24
5,165,661 A * 11/1992 Wright .................... B66F 15/00 254/131
6,079,696 A * 6/2000 Bette .................... E04F 21/0023 254/131
6,964,407 B1 * 11/2005 Butler .................... B66F 19/005 254/131
2011/0173778 A1 * 7/2011 Wales ...................... B25G 3/20 16/426

* cited by examiner

*Primary Examiner* — Tyrone V Hall, Jr.
(74) *Attorney, Agent, or Firm* — Mark Young, PA

(57) ABSTRACT

A manhole cover lifting tool includes an elongated bar. A pivoting L-hook and a fixed J-hook are attached at one end of the bar. A pivoting support base is attached between the ends of the bar. The support base includes a pair of legs extending from a base assembly. The base assembly includes a first plate, a second plate and a turntable bearing disposed between the first plate and the second plate. A cap fitting threadedly engages an end of the bar. A cleanout tool extends from the cap fitting into a hollow interior of the bar. A light source is attached near an end of the bar. A handle assembly is clamped to the bar between the support assembly and end.

19 Claims, 10 Drawing Sheets

MANHOLE COVER LIFTER

FIELD OF THE INVENTION

This invention relates generally to manhole cover, and, more particularly, to a lifter for a manhole cover that operates as a lever to provide mechanical advantage and pivots about the fulcrum in two dimensions.

BACKGROUND OF THE INVENTION

Manhole covers are generally made of cast iron and are extremely heavy. Removing one can cause serious injury to a person's back and spine if proper precautions are not taken. Over the years, various tools have been devised to facilitate unseating and removing manhole covers. One such tool, known as a manhole cover hook facilitates engaging the manhole cover and minimizes bending of the user's torso. But without any mechanical advantage, the user of a hook is relegated to bearing the entire weight of the manhole cover. With the hook engaged, the user typically straddles the manhole cover and lifts, preferably with their back straight and their knees bent. To reduce risk of back injuries, most are aware of the recommendation to lift using legs not one's back. Even then, various injuries (e.g., shoulder, knee and back) injuries are still possible. The process can also be exhausting.

The manhole cover contains features (e.g., notches, slots or holes) that the hook engages. These features are typically filled with dirt and debris, which must be removed before a hook can engage the manhole cover. Many workers attempt to clean out these features with a finger. Some may have a screwdriver that they can use for the task.

Over the years, other manhole lifting devices have been devised. They range from variations of the basic hook to bulky complex hoisting mechanisms. Levers for lifting a manhole cover by engaging the cover through a peripheral slot and pushing down on a handle of the lever are described in U.S. Pat. Nos. 3,985,338 and 5,775,674 US Application Publication No. 2021/0214207. Hooks that hang down from the lifting end of the levers, wherein the hook is L-shaped and sized to engage the cover through a peripheral slot are described in U.S. Pat. Nos. 2,655,399, 3,985,338, 5,775,674. A bulky swivel base that allows the lever to rotate from side to side is disclosed in each of U.S. Pat. No. 5,775,674 and US Patent Application Publication No. 2021/0214207. While each of these lifting devices is useful for its intended purpose, it suffers shortcomings.

Most of the lever devices do not pivot (yaw, i.e., turn by angular motion about the vertical axis) from side to side to facilitate unseating the cover. The few that pivot use a bulky inefficient mechanism. For example, U.S. Pat. No. 5,775,674 describes a bulky base with a threaded shaft screwed into an upright portion of the base. The threaded shaft permits the pole (lever) to rotate clockwise and counterclockwise with respect to the base. In addition, a joint or hinge permits the pole to pitch (i.e., rotate up and down). A similar base is referred to as a stool in US Patent Application Publication No. 2021/0214207.

None of the prior tools incorporates a cleaning implement. The user is relegated to using a finger, at risk of injury, or adapting another tool for the task.

None of these prior tools include a light source. Often manhole covers must be removed at night or early morning hours before sunrise. Even during the day, when a cover is removed, visibility into the hole is extremely limited.

What is needed is a tool that provides mechanical advantage to unseat and remove a manhole cover. The tool should be compact and easy to deploy, without assembly. The tool should include a cleaning implement and a light source. The tool should be capable of pitching and yawing motion. The yawing motion should be accomplished with a bearing assembly to reduce the significant friction forces that a bulky manhole cover may otherwise cause.

The invention is directed to overcoming one or more of the problems and solving one or more of the needs as set forth above.

SUMMARY OF THE INVENTION

To solve one or more of the problems set forth above, in an exemplary implementation of the invention, a manhole cover lifting tool includes an elongated bar (e.g., a hollow pipe, such as a hollow steel pipe with an inner diameter of at least 1-inch) having a first end (e.g., leading edge) and an opposite second end (e.g., trailing edge). A pivoting hook is attached at the first end of the bar. A pivoting support base is attached between the first end of the bar and the second end of the bar. The support base includes a pair of legs extending from a base assembly. The elongated bar is pivotally attached to the pair of legs. The base assembly includes a first plate, a second plate and a turntable bearing disposed between the first plate and the second plate. The turntable bearing enables rotation of the first plate relative to the second plate. The pair of legs are attached to the first plate.

A J-shaped hook is fixed to the first end of the bar. This hook facilitates dragging a manhole cover.

The second end of the bar may include external threads. A cap fitting may threadedly engage the second end. A cleanout tool may extend from the cap fitting into the hollow elongated bar.

A light source may be attached to the bar adjacent to the first end. The light source may be a flashlight. At least one clamp may be attached to the bar and secures the flashlight to the bar.

The turntable bearing may include a first bearing plate and a second bearing plate, and an annular groove formed in each of the first bearing plate and the second bearing plate. The annular groove of the first bearing plate is aligned with and opposed to the annular groove of the second bearing plate. The annular groove of the first bearing plate and the annular groove of the second bearing plate define an annular passage (e.g., a race). A plurality of balls (ball bearings) is disposed in the annular passage between the first bearing plate and the second bearing plate.

The pivoting hook may include a pair of arms. The pair of arms are attached to the bar at one end and attached to a 90-degree metal angle at the opposite end. The 90-degree metal angle is sized to engage a manhole cover.

The tool may also include a handle assembly with a handle and a pipe clamp attached to the handle. The pipe clamp secures the handle assembly to the bar between the support assembly and the second end. The handle extends perpendicular to the bar.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

An exemplary tool for lifting a manhole cover according to principles of the invention includes an elongated bar that provides mechanical advantage to unseat and remove a manhole cover. The exemplary tool is compact and easy to deploy, without any assembly. The exemplary tool includes both a cleaning implement and a light source. The exemplary tool is capable of pitching and yawing motion. The yawing motion is accomplished with a bearing assembly in a compact base to reduce the significant friction forces that a bulky manhole cover may otherwise cause.

Figure 1:
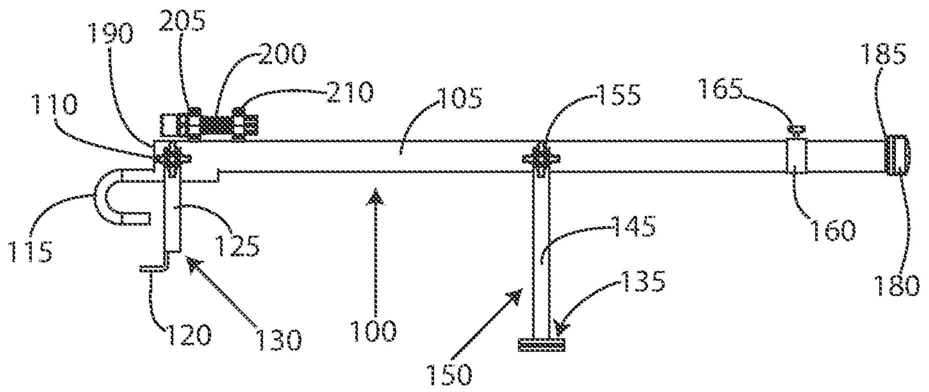
FIG. 1 is a side view of an exemplary manhole cover lifting tool according to principles of the invention.
Figure 2:
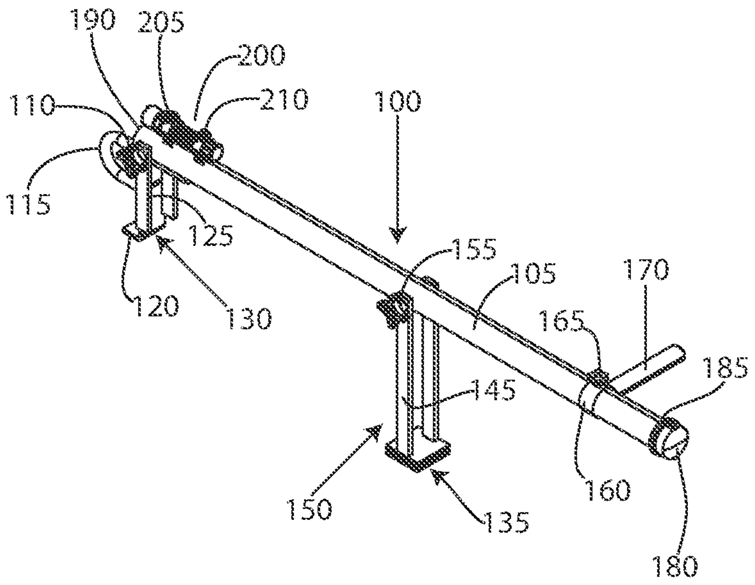
FIG. 2 is a perspective view of an exemplary manhole cover lifting tool according to principles of the invention.

FIGS. 1 and 2 conceptually illustrate an exemplary manhole cover lifting tool 100 according to principles of the invention. The tool 100 is an assembly that includes a bar 105. The bar 105 is elongated. It functions as a beam of a lever that pivots about a fulcrum, in this case a support assembly 150. In an exemplary embodiment, the bar 105 is a hollow galvanized steel pipe, approximately 42-inches in length from a trailing edge 185 to a leading edge 190. The length should be at least three feet. A length that is longer than 42-inches such as four or five feet may be used. Such longer lengths may be more difficult to store and carry. The diameter of the pipe is at least 1-inch (nominal inside diameter), with a larger diameter of 1.25 or 1.5 inch being more preferred for additional strength.

The trailing edge 185 of the bar 105 is threaded. A cap fitting 180 is threaded onto the trailing edge of the bar. The cap fitting 180 is a part of a cleanout tool, discussed below.

A support assembly 150 is attached to the bar at about the middle of the bar 150 (i.e., the middle between the leading edge 190 and trailing edge 185), or at a point between the leading edge 190 and the middle. The support assembly is attached a sufficient distance from the leading edge 190 to avoid interference with the L-hook 130 when the L-hook 130 is pivoted against the bar 105. Thus, the distance between the point of attachment of the support assembly 150 and the point of attachment of the L-hook 130 equals or exceeds the length of the L-hook 130.

The support assembly 150 serves several functions. First, it operates as a fulcrum about which the bar 105 pivots. Thus, the bar 105 and support assembly operate as a lever. Second, the support assembly provides swiveling capability.

The support assembly 150 includes a pair of legs 145 that extend from the bar 105 to a base 135. The upper ends of the legs 145 include aligned mounting holes. A nut (e.g., knob nut 155) engages a bolt that extends through the aligned holes in the legs and an aligned hole in the bar 105. When the nut 155 is sufficiently loose, the bar 105 may freely pivot about the bolt. When the nut 155 is tightened, pivoting motion is resisted. In this manner, the support assembly 150 may be deployed to an orientation that is generally perpendicular to the bar 105. The bar 105 may pivot, relative to the support assembly 150. During such pivoting, the angles between the support assembly and bar 105 will change. Additionally, for storage and transportation, the support assembly 150 may be pivoted against the bar 105 and the nut 155 may be tightened to secure the support assembly in that position.

The base 135 of the support assembly is a compact base 135 that swivels (i.e., yaws, or rotates about an axis, e.g., a vertical axis, that is orthogonal to the pivoting axis). The base is described in greater detail below. The base 135 is attached (e.g., welded) to the legs 145. The bottom of the base 135 contacts the ground when the tool is in use.

Two separate hooks are provided at (i.e., at or about, in the immediate vicinity of) the leading edge 190. One hook is an L-hook 130, which is an L shaped hook. The L-hook 130 is capable of pivoting motion relative to the bar 105. A primary function of the L-Hook 130 is to engage a manhole cover at an engagement feature while the manhole cover is unseated and removed.

The L-hook 130 includes a pair of arms 125 that extend from the bar 105 to a base 135. The upper ends of the arms 125 include aligned mounting holes 225. A nut (e.g., knob nut 110) engages a bolt that extends through the aligned holes 225 in the arms and an aligned holes 230 in the bar 105. When the nut 110 is sufficiently loose, the bar 105 may freely pivot about the bolt. When the nut 110 is tightened, pivoting motion is resisted. In this manner, the L-hook 130 may be allowed to freely swing, and deployed to an orientation that is generally vertical. The L-hook 130 may freely pivot, relative to the bar 105. During such pivoting, the angles between the L-hook 130 and bar 105 will change. Additionally, for storage and transportation, the L-hook 130 may be pivoted against the bar 105 and the nut 110 may be tightened to secure the support assembly in that position.

The arms 125 are shorter than the legs 145. The lengths of the arms 125 is between ⅓ to ¾ of the lengths of the legs 145. This configuration allows a range of pivoting motion of the bar 105 without collapsing the L-hook 130.

The bottom of the L-hook 130 includes a L-shaped bend 120. The bend 120 may comprise a steel 90° angle attached (e.g., welded) to the legs 125. The bend is sized to engage an engagement feature (e.g., slot) of a manhole cover. The width of the bend 120 is not greater than the width of the engagement feature, to allow the bend 120 to fit into the engagement feature.

A fixed J-hook 115 is also provided at the leading edge 190 of the bar. The J-hook 115 is used to engage an unseated or removed manhole cover. The J hook may engage an edge of the cover or an engagement feature of the cover. A user may pull the tool 100 with the J-hook 115 engaged to the cover, to move the manhole cover in a desired direction. The radius of curvature of the inner bend of the J-hook 115 is preferably at least ½ of the thickness of a manhole cover, as measured at an edge of a manhole cover and/or at an engagement feature of the manhole cover.

A light source 200 is provided at the leading edge 190. The exemplary light source 200 is a flashlight (e.g., an LED flashlight) clamped to the bar 105 at the leading edge 190, opposite the L-hook 130. A pair of pipe clamps 205, 210 attached to the bar 105 secure the flashlight 200 to the bar. Light sources other than a removable flashlight may be used without departing from the scope of the invention.

A handle 170 is attached to bar 105 between the support assembly 150 and trailing edge 185. A pipe clamp 160 and tightening bolt 165 secure the handle 170 in a desired position. The handle 170 extends perpendicular to the bar 105.

Figure 3:
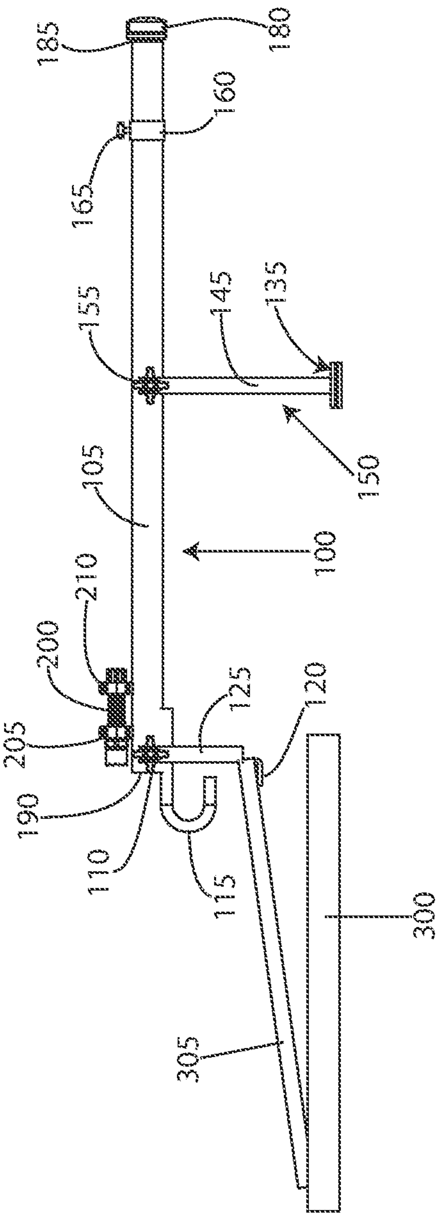
FIG. 3 is a side view of an exemplary manhole cover lifting tool engaging a manhole cover according to principles of the invention.
Figure 4:
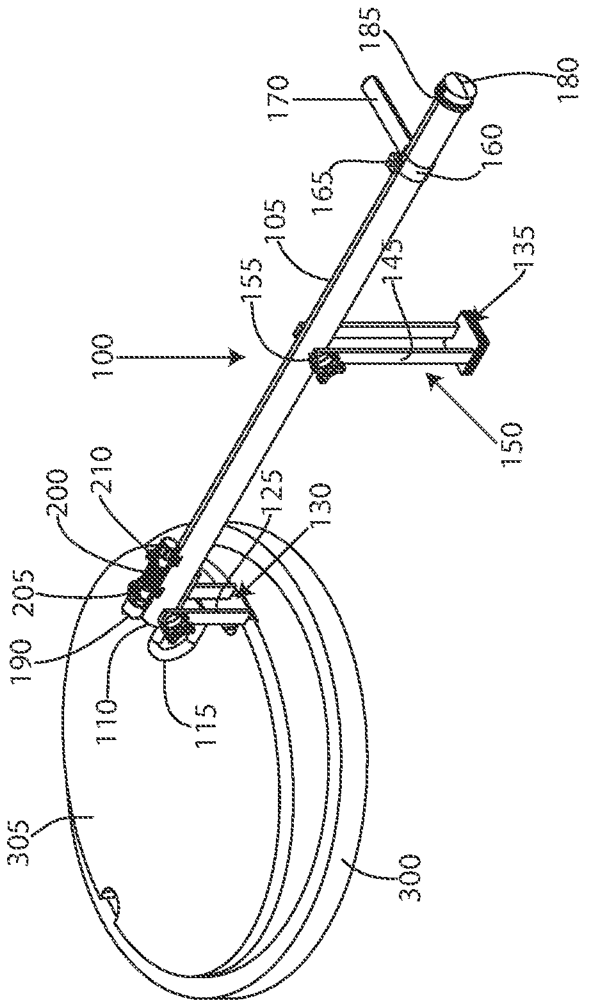
FIG. 4 is a perspective view of an exemplary manhole cover lifting tool engaging a manhole cover according to principles of the invention.

FIGS. 3 and 4 conceptually illustrate use of an exemplary manhole cover lifting tool 100 to engage and raise a manhole cover 305 from a manhole 300, according to principles of the invention. A small lip is provided in the manhole 300 to support the manhole cover 305. The base 135 is supported on the ground, while the bend 120 of the L-hook 130 engages an engagement feature (e.g., a slot, such as slot 306) of the manhole cover 305 for lifting. Downward force is applied by a user to the handle 170 and the bar 105 at the trailing edge 185. The downward force causes the leading edge to raise, thereby lifting the manhole cover 305.

Figure 5:
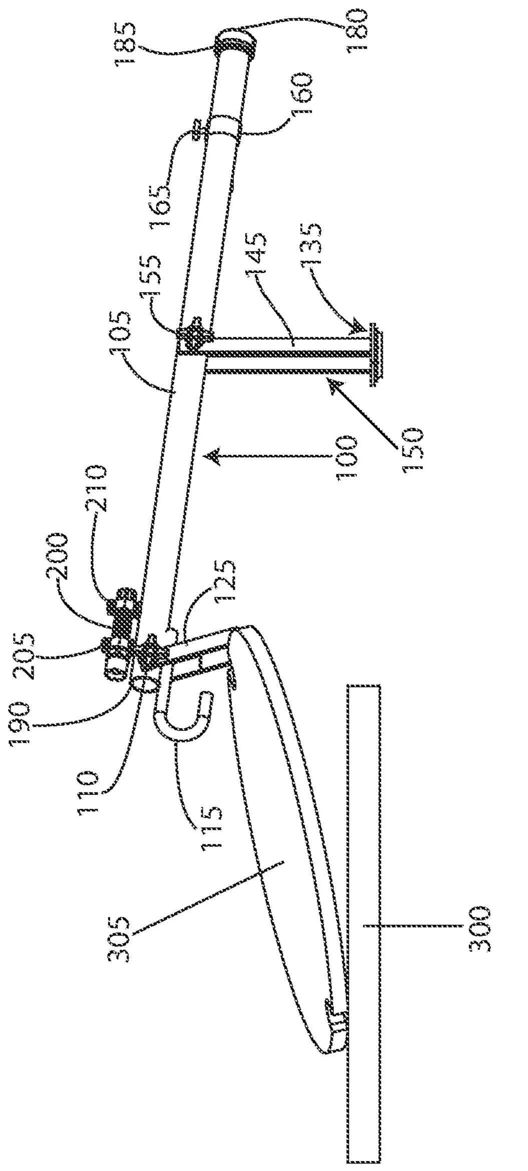
FIG. 5 is a side view of an exemplary manhole cover lifting tool pivoting an engaged manhole cover according to principles of the invention.
Figure 6:
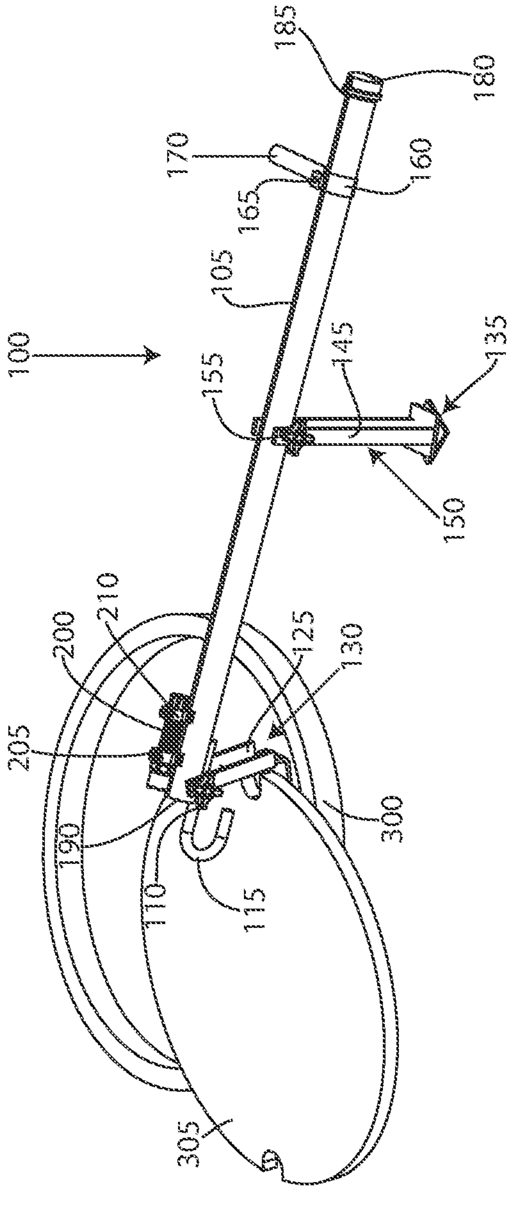
FIG. 6 is a perspective view of an exemplary manhole cover lifting tool pivoting an engaged manhole cover according to principles of the invention.

When the manhole cover 305 is raised, the tool 100 is used to pivot the raised cover 305, as conceptually illustrated in FIGS. 5 and 6. Such pivoting prevents the cover 305 from falling back into a closed position. Such pivoting may be accomplished by exerting a sideways force normal to the bar 105 at the trailing edge 185. Such force causes the bar 105 to swivel (i.e., yaw). Such swiveling moves the manhole cover 305 from a seated position. The manhole cover 305 is then unseated and at least partially removed. The manhole cover 305 may then be pulled (e.g., dragged) completely off the manhole 300 using the J-hook. This exposes the entire manhole for worker entry and exit.

Figure 7:
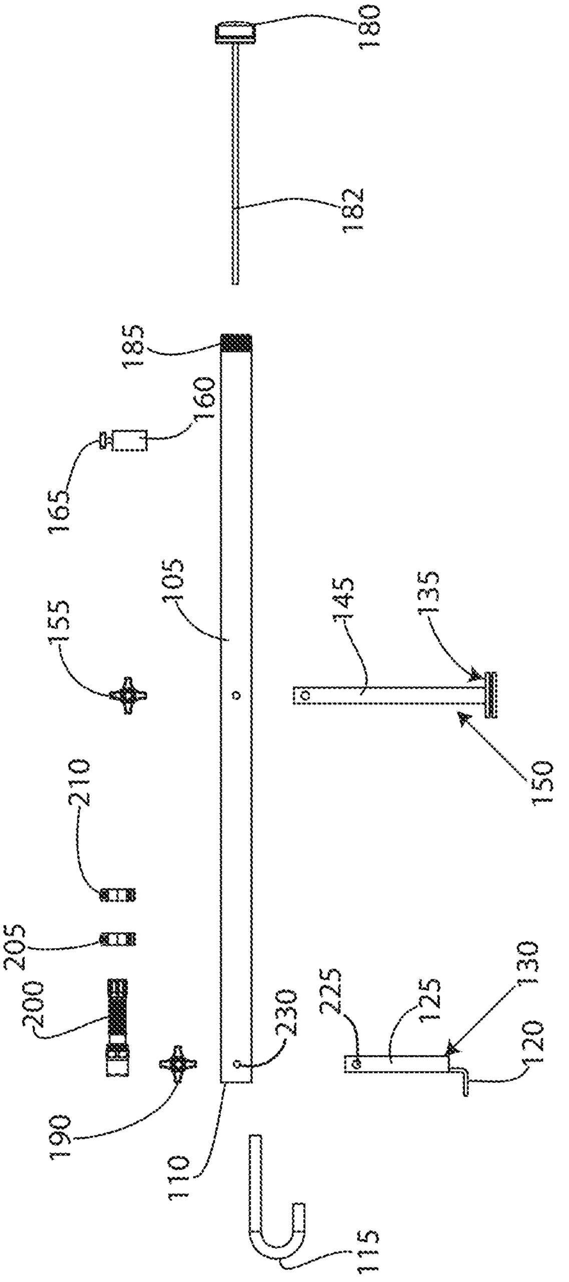
FIG. 7 is a side exploded view of an exemplary manhole cover lifting tool according to principles of the invention.
Figure 8:
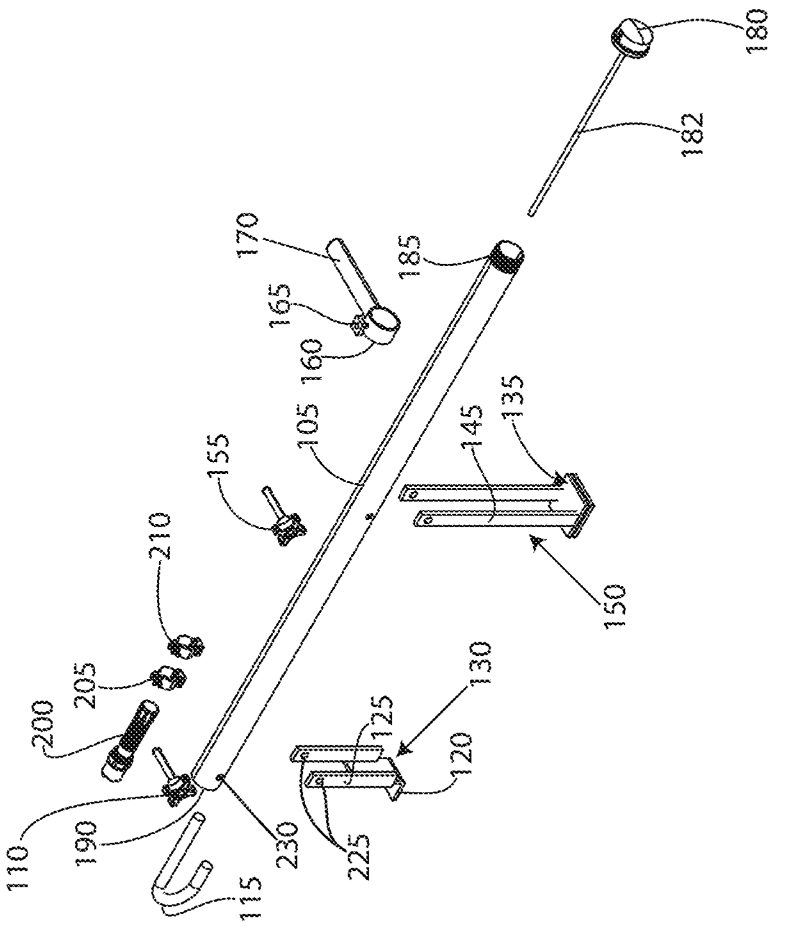
FIG. 8 is a perspective exploded view of an exemplary manhole cover lifting tool according to principles of the invention.

The exploded views of FIGS. 7 and 8 reveal the cleanout tool 182, an elongated bar attached to the cap fitting 180. Internal threads of the cap fitting 180 threadedly engage the external threads of the trailing edge 185 of the bar 105. Removing the cap fitting 180 from the bar 105 exposes the cleanout tool 182. The cleanout tool 182 is used to scrape dirt and debris from the engagement feature of the manhole cover 305 to permit engagement by the L-hook 130.

Figure 9:
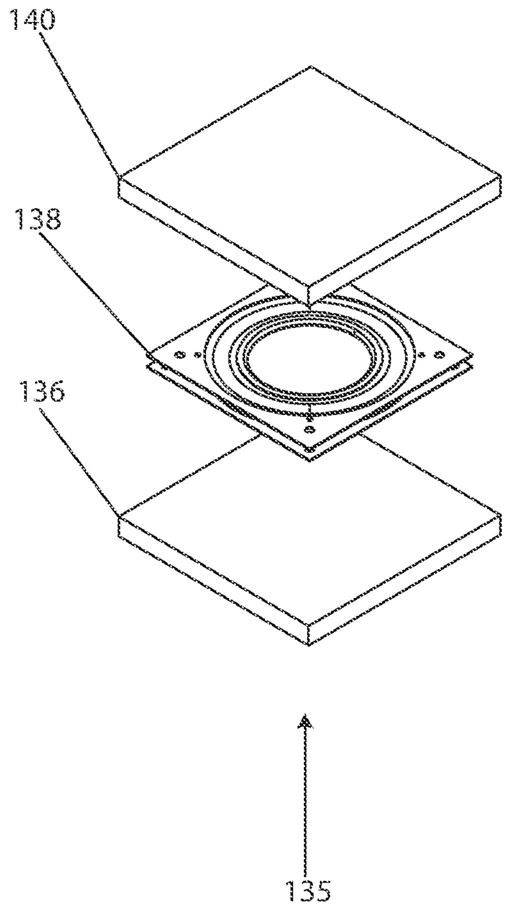
FIG. 9 is a perspective exploded view of an exemplary compact swivel base for a manhole cover lifting tool according to principles of the invention.
Figure 10:
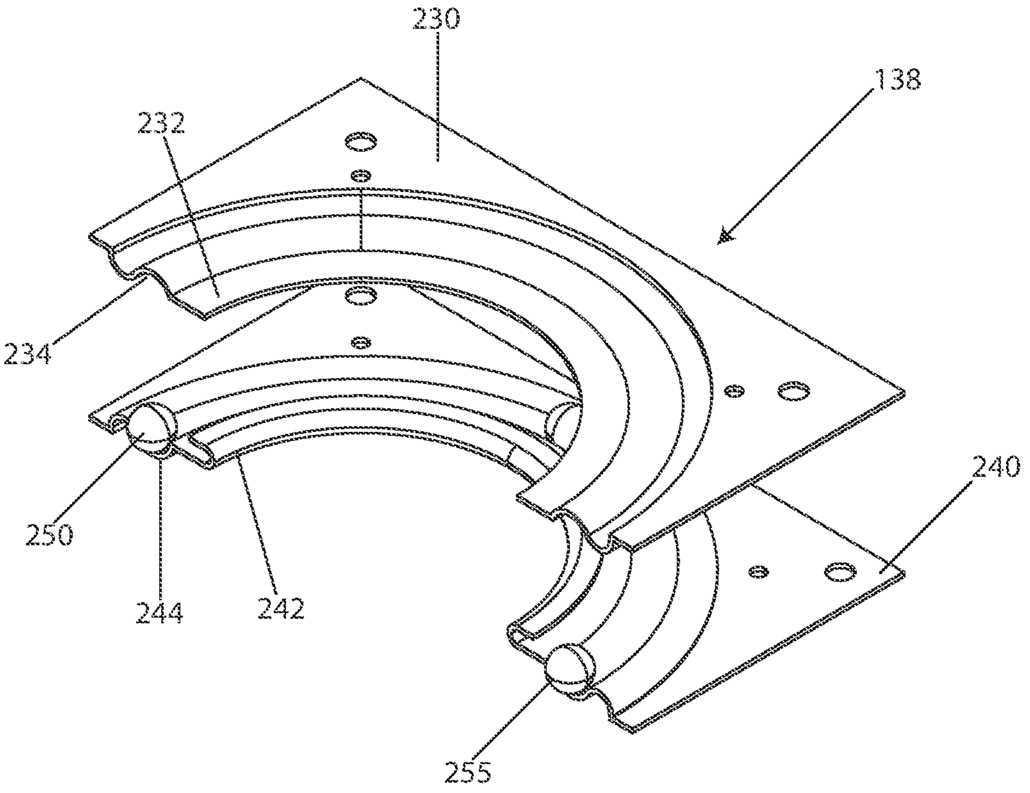
FIG. 10 is a partially exploded section view of an exemplary turntable bearing assembly for a manhole cover lifting tool according to principles of the invention.

FIG. 9 provides a perspective exploded view of an exemplary compact swivel base 135 for a manhole cover lifting tool 100 according to principles of the invention. The base includes a lower base plate 136, an upper base plate 140 and a turntable bearing 138 between the lower base plate 136 and upper base plate 140. The turntable bearing 138, as shown in FIG. 10, includes an upper bearing plate 230 that attaches to the underside of the upper base plate 140, a lower bearing plate 240 that attaches to the upper side of the lower base plate 136. Such attachments may be by mechanical fasteners (e.g., screws, bolts, rivets) and/or by welding. An annular groove 234, 244 having a semicircular cross section shape is formed in each of the upper bearing plate 230 and the lower bearing plate 240. The annular grooves 234, 244 align when the upper bearing plate 230 overlays the lower bearing plate 240. An annular lip 232 of the upper bearing plate 230 fits within an annular rolled edge of the lower bearing plate 240 when the turntable bearing 138 is assembled. A plurality of balls (ball bearings) 250, 255 are disposed in the space defined between the aligned annular grooves 234, 244. Four or more balls are preferably used. The balls 250, 255 facilitate swiveling rotation of the upper bearing plate 230 relative to the lower bearing plate 240, even when a considerable load is supported.

The turntable bearing provides a compact low profile bearing assembly that is integrated into the base. The base plates may be rectangular or square. Each may be about 4 inches by 4 inches. Each of the upper plate and lower plate may be ¼ inch (or less) thick. Thus, the turntable bearing may be less than one inch thick (i.e., one inch in height), and preferably less than ½-inch thick. Thus, the entire base may be less than 1.5 inches, or preferably less than 1 inch in thickness.

As used herein, the preposition at, when denoting a location, means at or about, which means precisely at and/or in the immediate vicinity of. All dimensions are provided as nonlimiting examples. Dimensions may be varied without departing from the scope of the invention. Labels such as left, right, front, back, top, inside, outside, bottom, forward, reverse, clockwise, counter clockwise, up, down, leading, trailing, distal, proximal or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object. In addition, reference to "first," "second," "third," and etc. members throughout the disclosure (and in particular, claims) is not used to show a serial or numerical limitation but instead is used to distinguish or identify the various members of the group. Further the terms "a" and "an" throughout the disclosure (and in particular, claims) do not denote a limitation of quantity, but rather denote the presence of at least one of the referenced items.

In addition, any element in a claim that does not explicitly state "means for" performing a specified function, or "step for" performing a specific function, is not to be interpreted as a "means" or "step" clause as specified in 35 U.S.C. Section 112, Paragraph 6, and is not intended to invoke the provisions of 35 U.S.C. 112, Paragraph 6.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A manhole cover lifting tool comprising:
- an elongated bar having a first end, an opposite second end, the first end including a bottom, and a first pair of aligned holes adjacent to the first end;
- a pivoting hook fixed at the first end of the bar, the pivoting hook comprising a pair of arms, a second pair of aligned holes including one hole in each arm of the pair of arms, a bolt extending through the first and second pairs of aligned holes pivotally attaching the pivoting hook to the elongated bar, the 90-degree metal angle being sized to engage a manhole cover;
- a J-shaped hook including a shank and a tip, the tip including a free end, the tip being joined to the shank by a bend, the shank being fixed to the bottom of the first end of the elongated bar; and
- a pivoting support base attached between the first end of the bar and the second end of the bar, wherein the support base includes a pair of legs extending from a base assembly, and the elongated bar is pivotally attached to the pair of legs, and the base assembly includes a first plate, a second plate and a turntable bearing disposed between the first plate and the second plate, the turntable bearing enabling rotation of the first plate relative to the second plate, and the pair of legs are attached to the first plate.

2. The manhole cover lifting tool of claim 1, wherein the elongated bar is hollow, and the second end includes external threads, and the manhole cover lifting tool further comprises a cap fitting threadedly engaged to the second end, and a cleanout tool extends from the cap fitting into the hollow elongated bar.

3. The manhole cover lifting tool of claim 1, further comprising a light source attached to the bar adjacent to the first end.

4. The manhole cover lifting tool of claim 3, wherein the light source comprises a flashlight, and the manhole cover lifting tool further comprises at least one clamp attached to the bar, the at least one clamp securing the flashlight to the bar.

5. The manhole cover lifting tool of claim 1, the turntable bearing comprising a first bearing plate and a second bearing plate, an annular groove formed in each of the first bearing plate and the second bearing plate, the annular groove of the first bearing plate being aligned with and opposed to the annular groove of the second bearing plate, and the annular groove of the first bearing plate and the annular groove of the second bearing plate defining an annular passage, and a plurality of balls disposed in the annular passage between the first bearing plate and the second bearing plate.

6. The manhole cover lifting tool of claim 1, further comprising a handle assembly, the handle assembly including a handle and a pipe clamp attached to the handle, the pipe clamp securing the handle assembly to the bar between the support assembly and the second end, and the handle extending perpendicular to the bar.

7. The manhole cover lifting tool of claim 1, the bar comprising steel pipe with an inner diameter of at least 1-inch.

8. A manhole cover lifting tool comprising:
- an elongated bar having a top, a bottom, a first end, an opposite second end, and a first pair of aligned holes adjacent to the first end, wherein the elongated bar is hollow;
- a pivoting hook attached at the first end of the bar, the pivoting hook comprising a pair of arms, a second pair of aligned holes including one hole in each arm of the pair of arms, a bolt extending through the first and second pairs of aligned holes pivotally attaching the pivoting hook to the elongated bar, the 90-degree metal angle being sized to engage a manhole cover;
- a pivoting support base attached between the first end of the bar and the second end of the bar; and
- a J-shaped hook fixed to the bottom of the first end of the bar.

9. The manhole cover lifting tool of claim 8, wherein the second end includes external threads, and the manhole cover lifting tool further comprises a cap fitting threadedly engaged to the second end, and a cleanout tool extends from the cap fitting into the hollow elongated bar.

10. The manhole cover lifting tool of claim 9, further comprising a light source attached to the bar adjacent to the first end.

11. The manhole cover lifting tool of claim 10, wherein the light source comprises a flashlight, and the manhole cover lifting tool further comprises at least one clamp attached to the bar, the at least one clamp securing the flashlight to the bar.

12. The manhole cover lifting tool of claim 8, wherein the support base includes a pair of legs extending from a base assembly, and the elongated bar is pivotally attached to the pair of legs, and the base assembly includes a first plate, a second plate and a turntable bearing disposed between the first plate and the second plate, the turntable bearing enabling rotation of the first plate relative to the second plate, and the pair of legs are attached to the first plate, the turntable bearing comprising a first bearing plate and a second bearing plate, an annular groove formed in each of the first bearing plate and the second bearing plate, the annular groove of the first bearing plate being aligned with and opposed to the annular groove of the second bearing plate, and the annular groove of the first bearing plate and the annular groove of the second bearing plate defining an annular passage, and a plurality of balls disposed in the annular passage between the first bearing plate and the second bearing plate.

13. The manhole cover lifting tool of claim 8, further comprising a handle assembly, the handle assembly including a handle and a pipe clamp attached to the handle, the pipe clamp securing the handle assembly to the bar between the support assembly and the second end, and the handle extending perpendicular to the bar.

14. The manhole cover lifting tool of claim 8, the bar comprising steel pipe with an inner diameter of at least 1-inch.

15. A manhole cover lifting tool comprising:
- an elongated bar having a first end, an opposite second end, and a first pair of aligned holes adjacent to the first end, wherein the elongated bar is a hollow pipe with an inner diameter of at least 1-inch;
- a pivoting hook attached at the first end of the elongated bar, the pivoting hook comprising a pair of arms, a second pair of aligned holes including one hole in each arm of the pair of arms, a bolt extending through the first and second pairs of aligned holes pivotally attaching the pivoting hook to the elongated bar, the 90-degree metal angle being sized to engage a manhole cover;

a pivoting support base attached between the first end of the elongated bar and the second end of the elongated bar; and a J-shaped hook fixed to the first end of the elongated bar.

16. The manhole cover lifting tool of claim 15, wherein the second end includes external threads, and the manhole cover lifting tool further comprises a cap fitting threadedly engaged to the second end, and a cleanout tool extends from the cap fitting into the hollow elongated bar.

17. The manhole cover lifting tool of claim 15, further comprising a light source attached to the bar adjacent to the first end.

18. The manhole cover lifting tool of claim 17, wherein the light source comprises a flashlight, and the manhole cover lifting tool further comprises at least one clamp attached to the bar, the at least one clamp securing the flashlight to the bar.

19. The manhole cover lifting tool of claim 15 further comprising:

a handle assembly, the handle assembly including a handle and a pipe clamp attached to the handle, the pipe clamp securing the handle assembly to the bar between the support assembly and the second end, and the handle extending perpendicular to the bar.

* * * * *